Patented June 13, 1933

1,913,364

UNITED STATES PATENT OFFICE

WALTER BADER AND EDWARD ERIC STIMSON, OF SPONDON, NEAR DERBY, ENGLAND, ASSIGNORS TO CELANESE CORPORATION OF AMERICA, A CORPORATION OF DELAWARE

TREATMENT OF GASES CONTAINING CARBON DIOXIDE AND HYDROGEN

No Drawing. Application filed April 2, 1930, Serial No. 441,170, and in Great Britain July 2, 1929.

This invention relates to the treatment of mixtures of carbon dioxide and hydrogen for the purpose of reducing or eliminating their hydrogen content, and has particular reference to the manufacture of carbon monoxide from such gas mixtures.

The invention relates more especially to the treatment of mixtures of carbon dioxide and hydrogen recovered from the wash waters employed in the pressure washing or scrubbing of industrial mixtures of carbon monoxide and hydrogen, but is not limited to the treatment of such mixtures of carbon dioxide and hydrogen.

In many industrial chemical operations in which industrial mixtures of CO and H (e. g. water gas or producer gas, either in their original composition or after treatment to vary their composition, e. g. by passing them mixed with steam over catalyst) are submitted to catalytic operations, it is usual to remove the carbon dioxide by washing or scrubbing under pressure with water prior to submitting the gas mixtures to reaction. In such pressure washing or scrubbing, the wash water dissolves carbon dioxide and at the same time a considerable quantity of hydrogen and carbon monoxide are also dissolved. On releasing the pressure, the carbon dioxide is yielded up mixed with the carbon monoxide, hydrogen and other gases originally dissolved therewith.

The presence of the hydrogen in such and other mixtures of carbon dioxide and hydrogen is very undesirable if the gas mixture is to be employed for the manufacture of carbon monoxide by processes in which the reduction is effected by passing the gas in contact with hot carbon, e. g. charcoal, coke or the like. The presence of hydrogen not only reduces the efficiency of the reduction but the carbon monoxide so produced may, by reason of its contamination with hydrogen be unsuitable for use in subsequent catalytic operations.

According to the invention, we reduce or eliminate the hydrogen content of gas mixtures containing carbon dioxide and hydrogen (and especially the mixtures of carbon dioxide and hydrogen more particularly hereinbefore referred to) by passing said gas mixtures in contact with heated "chromite", a mineral which has the approximate composition $FeO.Cr_2O_3$ (ignoring any silica, alumina, or magnesia).

The treatment of the gas mixtures may be effected at temperatures upwards of about 700° C., temperatures between 800° and 900° C. being especially suitable.

The treatment may be effected in any convenient manner, as for instance by passing the gas mixtures in a stream through a tube (e. g. a tube of heat resisting steel) fitted or provided with small lumps of the chromite heated to the desired temperature. We prefer to pass the gas mixture at a rapid rate.

The gas mixtures may, if desired, be freed from water vapour as far as possible prior to passing them in contact with the chromite.

After passage over the chromite, the hydrogen content is largely or substantially eliminated and the resulting mixture contains a correspondingly large proportion of carbon monoxide. This is a great advantage when the gas mixture is to be employed for the manufacture of carbon monoxide, in that it means an economy of carbon, (e. g. coke, charcoal or the like) for the conversion.

When the gas mixtures are to be employed for the manufacture of carbon monoxide, they may be passed, subsequent to their passage over the chromite, as hereinbefore described, over hot carbon, (e. g. coke, charcoal or the like) in any manner employed in the production of carbon monoxide from carbon dioxide. We prefer to remove water vapour as far as possible from the gas mixtures prior to passing them over the hot charcoal, coke or other form of carbon, and we prefer to dry the charcoal, coke or the like before use.

The following example serves to illustrate one convenient form of execution of the invention, it being understood that it is given only by way of illustration and is in no way limitative.

Example

Crude carbon dioxide, recovered from the water washing or scrubbing of water gas under pressure and containing approximately 79% $CO_2$ and 13% hydrogen as well as small proportions of carbon monoxide and nitrogen, is passed in a rapid stream through a tube (e. g. of chromium-nickel-steel) which is filled with small pieces of chromite (e. g. ¼ to ½ inch size) and heated to a temperature between 800° and 900° C. The resulting gas mixture contains very much less hydrogen, a typical analysis showing approximately 71% $CO_2$, 25% CO and 2% or less of hydrogen. The resulting gas may be passed over hot carbon (e. g. charcoal, or coke) in the manner usually employed for the manufacture of carbon monoxide from carbon dioxide.

What we claim and desire to secure by Letters Patent is:—

1. Process for the treatment of gas mixtures comprising carbon dioxide and hydrogen for the purpose of reducing the hydrogen content thereof, said process comprising passing said gas mixtures in contact with heated "chromite."

2. Process for the treatment of gas mixtures comprising carbon dioxide and hydrogen for the purpose of reducing the hydrogen content thereof, said process comprising passing said gas mixtures in contact with "chromite" at temperatures above 700° C.

3. Process for the treatment of gas mixtures comprising carbon dioxide and hydrogen for the purpose of reducing the hydrogen content thereof, said process comprising passing said gas mixtures in contact with "chromite" at temperatures of between 800° and 900° C.

4. Process for the treatment of mixtures of carbon dioxide and hydrogen recovered from the wash waters employed in the pressure scrubbing of industrial mixtures of carbon monoxide and hydrogen, said process comprising passing said mixtures in contact with heated "chromite".

5. Process for the treatment of mixtures of carbon dioxide and hydrogen recovered from the wash waters employed in the pressure scrubbing of industrial mixtures of carbon monoxide and hydrogen, said process comprising passing said mixtures in contact wth "chromite" at temperatures between 800° and 900° C.

6. Process for the manufacture of carbon monoxide from industrial gases containing carbon dioxide and hydrogen, comprising reducing the hydrogen content of such industrial gases by passing them in contact with heated "chromite" and then passing them in contact with heated carbon.

7. Process for the manufacture of carbon monoxide from industrial gases containing carbon dioxide and hydrogen, comprising reducing the hydrogen content of such industrial gases by passing them in contact with "chromite" at temperatures above 700° C. and then passing them in contact with heated carbon.

8. Process for the manufacture of carbon monoxide from industrial gases containing carbon dioxide and hydrogen, comprising reducing the hydrogen content of such industrial gases by passing them in contact with "chromite" at temperatures of between 800° and 900° C. and then passing them in contact with heated carbon.

9. Process for the manufacture of carbon monoxide from industrial gases containing carbon dioxide and hydrogen, comprising reducing the hydrogen content of the industrial gases by passing them in contact with heated "chromite", removing water from the gases, and then passing them in contact with heated carbon.

In testimony whereof we have hereunto subscribe our names.

WALTER BADER.
EDWARD ERIC STIMSON.